Patented Sept. 27, 1938

2,131,126

UNITED STATES PATENT OFFICE 2,131,126

VULCANIZATION OF RUBBER

William P. ter Horst, Packnack Lake, N. J., assignor to United States Rubber Company, New York, N. Y., a corporation of New Jersey No Drawing. Application April 1, 1931, Serial No. 527,056

6 Claims. (Cl. 18—53)

This invention relates to mixed oxalates of aryl-substituted guanidines, and is herein illustrated as embodied in carboxylic esters such as the oxalates of basic rubber accelerator materials or compositions containing the same. The oxalates which are the mixed oxalates of organic amino compounds are useful as plasticizers, especially for rubber which requires calendering after vulcanization.

It has been known that many amines were accelerators, adapted to produce rapid vulcanization, but the rubber containing them and mercaptothiazole vulcanized so rapidly and at such a low temperature that the rubber "scorched" or incipiently vulcanized in the mill.

The material of the present invention is well adapted to be used with the compound 2-mercaptobenzothiazole. When so used, it has a distinct plasticizing action, like other mono-amino compounds; moreover it speeds vulcanization when so used but does not cause the premature vulcanization in the mill caused by practically all free amines when used with 2-mercaptobenzothiazole.

It will be observed in the data given below the decomposing point of the new oxalates used is well above the usual temperature of vulcanization, yet in the mold the activating oxalate cooperates with the 2-mercaptothiazole as if they mutually activated each other.

In other words the new material has tamed the 2-mercaptobenzothiazole on the mill and has activated it in the mold. The rubber after vulcanization has the so-called snappy quality of the rubber ordinarily obtainable at low temperature vulcanization and yet the small quantity needed of the new oxalates reduces accelerator costs. It enables softeners to be reduced or dispensed with, and effects a better dispersion of carbon black.

It is found that oxalates may speed vulcanization to be even faster than with 2-mercaptobenzothiazole, though avoiding scorching in the mill, as mentioned above. They thus are not open to the objection that they slow up vulcanization as do acetic acid compounds.

The oxalate compounds which effectuate the plasticizing have all the advantages of aniline without the objection of being poisonous, the objection which has prevented the use of aniline. Moreover they are often effective when as little as a quarter of one per cent is used.

*Example 1.*—Diphenylguanidine acid oxalate may be prepared as follows. 12.8 grams oxalic acid $(COOH)_2, 2H_2O$ are dissolved in 300 grams water. To this solution is added, at a temperature exceeding 80 degrees C. 21 grams diphenylguanidine and the temperature is gradually raised to boiling. The diphenylguanidine goes into solution in the form of the acid oxalate. The solution is then filtered from a small amount of water-insoluble material and the filtrate is allowed to cool. Diphenylguanidine acid oxalate separates out and is filtered, washed and dried. The product so obtained is a white powder melting at approximately 168 degrees C. with decomposition.

For test purposes the following rubber mix was used: smoked sheets 100 parts, sulfur 3 parts, zinc oxide 5 parts, stearic acid 1 part. Two mixes were made. One mix contained one part of 2-mercaptobenzothiazole as the accelerator and the other mix contained .3 part 2-mercaptobenzothiazole and .7 part diphenylguanidine acid oxalate. A scorch test showed that the stock containing one part 2-mercaptobenzothiazole scorched after running in the mill five hours at 80 degrees C. whereas it took eleven hours at 80 degrees C. before scorching took place with the stock containing a combination of 2-mercaptobenzothiazole and diphenylguanidine acid oxalate. The following test results were obtained:

| Cures— | Stock containing one part of 2-mercaptobenzothiazole—tensile strength in lbs. per square inch | Stock containing .3 part 2-mercaptobenzothiazole and .7 part of diphenylguanidine acid oxalate—tensile strength in lbs. per square inch |
|---|---|---|
| 5 min. at 290° F | 1,350 | 1,550 |
| 7 min. at 290° F | 2,550 | 2,780 |
| 15 min. at 270° F | 2,650 | 2,725 |
| 30 min. at 270° F | 4,325 | 4,725 |

*Example 2.*—Neutral diphenylguanidine oxalate may be prepared by adding one mole diphenylguanidine to a solution of one mole diphenylguanidine acid oxalate in water. The neutral diphenylguanidine oxalate is a white powder having a melting point of approximately 220–225 degrees C. with decomposition.

*Example 3.*—The mixed oxalate diphenylguanidine ammonium oxalate was obtained as a white powder when excess ammonium hydroxide was added to a hot solution of diphenylguanidine acid oxalate.

*Example 4.*—The mixed oxalate diphenylguanidine urea oxalate was obtained when one mole urea was added to a hot solution of one mole diphenylguanidine acid oxalate. This product is a white powder which melts at approximately 168 degrees C.

*Example 5.*—Diphenylguanidine-aniline oxalate. This product is obtained by adding one mole diphenylguanidine to a solution of aniline acid oxalate in water or by adding one mole aniline to a hot solution of diphenylguanidine acid oxalate. This white powder product melts at approximately 220 degrees C. with decomposition.

Instead of the 2-mercaptobenzothiazole mentioned as activated by the suitable oxalate other mercaptothiazoles may be used as well as their disulfides. For example, 2-mercaptotolylthiazole, chloro-2-mercaptobenzothiazoles, nitro-2-mercaptobenzothiazoles, and others. The oxalates may also be used in admixture or combination with esters of 2-mercaptobenzothiazole as, e. g., with the 2-4-dinitro-phenyl-ester or the chloro-acetone esters of mercaptobenthiazole.

Accelerators may also be made by producing the monophenylguanidine oxalates, phenylorthotolylguanidine oxalates, diorthotolylguanidine oxalates, phenylbiguanide oxalates, and orthotolylbiguanide oxalates.

The oxalates, as mentioned above, exert a favorable plasticizing action on the rubber. They yield a rubber which is softer before as well as after vulcanization. Besides the oxalates mentioned the following amines have been found to yield oxalates, neutral as well as acid which have great plasticizing power: urea, aniline, orthotoluidine, mixed toluidines, phenetidines. In this respect the oxalates, of diphenylethylenediamine and diphenylpropylenediamine have also been found to have remarkable plasticizing properties.

Having thus described certain embodiments of the invention, what is claimed is:

1. The substance diphenylguanidine ammonium oxalate.

2. The process of making vulcanized rubber which consists in mixing a vulcanizable rubber composition with a mercaptothiazole accelerator and a mixed oxalate of an aryl substituted guanidine and then heating it.

3. The process of making vulcanized rubber which consists in mixing a vulcanizable rubber composition with a benzothiazyl sulphide accelerator and a diarylguanidine ammonium oxalate.

4. The process of making vulcanized rubber which consists in mixing a vulcanizable rubber composition with a mercaptothiazole and a mixed oxalate of diphenylguanidine, and then heating it.

5. The process of making vulcanized rubber which consists in mixing a vulcanizable rubber composition with a mercaptobenzothiazole and with a mixed oxalate of an aryl substituted guanidine, and then heating it.

6. The process of making vulcanized rubber which consists in mixing a vulcanizable rubber composition with a mercaptobenzothiazole and with a mixed oxalate of diphenylguanidine, and then heating it.

WILLIAM P. TER HORST.